United States Patent
Park et al.

(10) Patent No.: US 12,489,169 B2
(45) Date of Patent: Dec. 2, 2025

(54) BATTERY MODULE WITH IMPROVED COOLING PERFORMANCE AND METHOD OF MANUFACTURING THE SAME

(71) Applicant: LG ENERGY SOLUTION, LTD., Seoul (KR)

(72) Inventors: Sung Kyu Park, Daejeon (KR); Jun Ho Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 574 days.

(21) Appl. No.: 17/915,877

(22) PCT Filed: Aug. 18, 2021

(86) PCT No.: PCT/KR2021/010914
§ 371 (c)(1),
(2) Date: Sep. 29, 2022

(87) PCT Pub. No.: WO2022/039477
PCT Pub. Date: Feb. 24, 2022

(65) Prior Publication Data
US 2023/0128584 A1    Apr. 27, 2023

(30) Foreign Application Priority Data
Aug. 21, 2020    (KR) ........................ 10-2020-0105019

(51) Int. Cl.
*H01M 50/291*    (2021.01)
*H01M 10/6556*    (2014.01)
(Continued)

(52) U.S. Cl.
CPC ..... *H01M 50/291* (2021.01); *H01M 10/6556* (2015.04); *H01M 10/658* (2015.04); *H01M 50/213* (2021.01)

(58) Field of Classification Search
CPC ........... H01M 50/291; H01M 10/6556; H01M 10/658; H01M 50/213; H01M 10/625;
(Continued)

(56) References Cited

U.S. PATENT DOCUMENTS 10,374,272 B1    8/2019    Dellon et al.
2012/0021260 A1    1/2012    Yasui et al.
(Continued)

FOREIGN PATENT DOCUMENTS

CN    108352586 A    7/2018
CN    207602735 U    7/2018
(Continued)

OTHER PUBLICATIONS

International Search Report for PCT/KR2021/010914 (PCT/ISA/210) mailed on Nov. 24, 2021.
(Continued)

*Primary Examiner* — Lisa S Park
(74) *Attorney, Agent, or Firm* — Birch, Stewart, Kolasch & Birch, LLP

(57) ABSTRACT

Discussed are a battery module with improved cooling performance and a method of manufacturing the battery module. The battery module may include a plurality of cylindrical battery cells, a module frame configured to electrically connect the plurality of cylindrical battery cells to each other, a heat sink located under the plurality of cylindrical battery cells, and an insulation layer formed on a surface of the heat sink in contact with the heat sink.

12 Claims, 5 Drawing Sheets

(51) Int. Cl.
*H01M 10/658* (2014.01)
*H01M 50/213* (2021.01)

(58) Field of Classification Search
CPC .............. H01M 50/507; H01M 10/613; H01M 10/643; H01M 10/653; H01M 10/6551; H01M 10/6554; H01M 50/24; B33Y 70/00; B33Y 80/00; Y02E 60/10
See application file for complete search history.

(56) References Cited

U.S. PATENT DOCUMENTS

| | | | |
|---|---|---|---|
| 2015/0174821 A1* | 6/2015 | Levine | B29C 64/112 264/401 |
| 2016/0020497 A1* | 1/2016 | Biskup | H01M 10/6551 429/120 |
| 2016/0093930 A1 | 3/2016 | Biskup et al. | |
| 2016/0093931 A1 | 3/2016 | Rawlinson et al. | |
| 2016/0293915 A1 | 10/2016 | Tsuchiya et al. | |
| 2017/0294693 A1 | 10/2017 | Tong et al. | |
| 2018/0022019 A1 | 1/2018 | Levine et al. | |
| 2018/0358666 A1 | 12/2018 | Siering et al. | |
| 2019/0312323 A1 | 10/2019 | Dellon et al. | |
| 2019/0348725 A1 | 11/2019 | Golubkov | |
| 2021/0050635 A1 | 2/2021 | Lee et al. | |

FOREIGN PATENT DOCUMENTS

| | | |
|---|---|---|
| CN | 108470958 A | 8/2018 |
| JP | 6357439 B2 | 7/2018 |
| KR | 10-2011-0118807 A | 11/2011 |
| KR | 10-2015-0073083 A | 6/2015 |
| KR | 10-1642871 B1 | 7/2016 |
| KR | 10-2016-0136617 A | 11/2016 |
| KR | 10-2017-0057465 A | 5/2017 |
| KR | 10-2017-0107798 A | 9/2017 |
| KR | 10-2072762 B1 | 2/2020 |
| KR | 10-2099906 B1 | 4/2020 |
| KR | 10-2112272 B1 | 5/2020 |
| WO | WO 2020/067665 A1 | 4/2020 |

OTHER PUBLICATIONS

Extended European Search Report for European Application No. 21858564.4, dated Aug. 5, 2024.

\* cited by examiner

[FIG. 1]
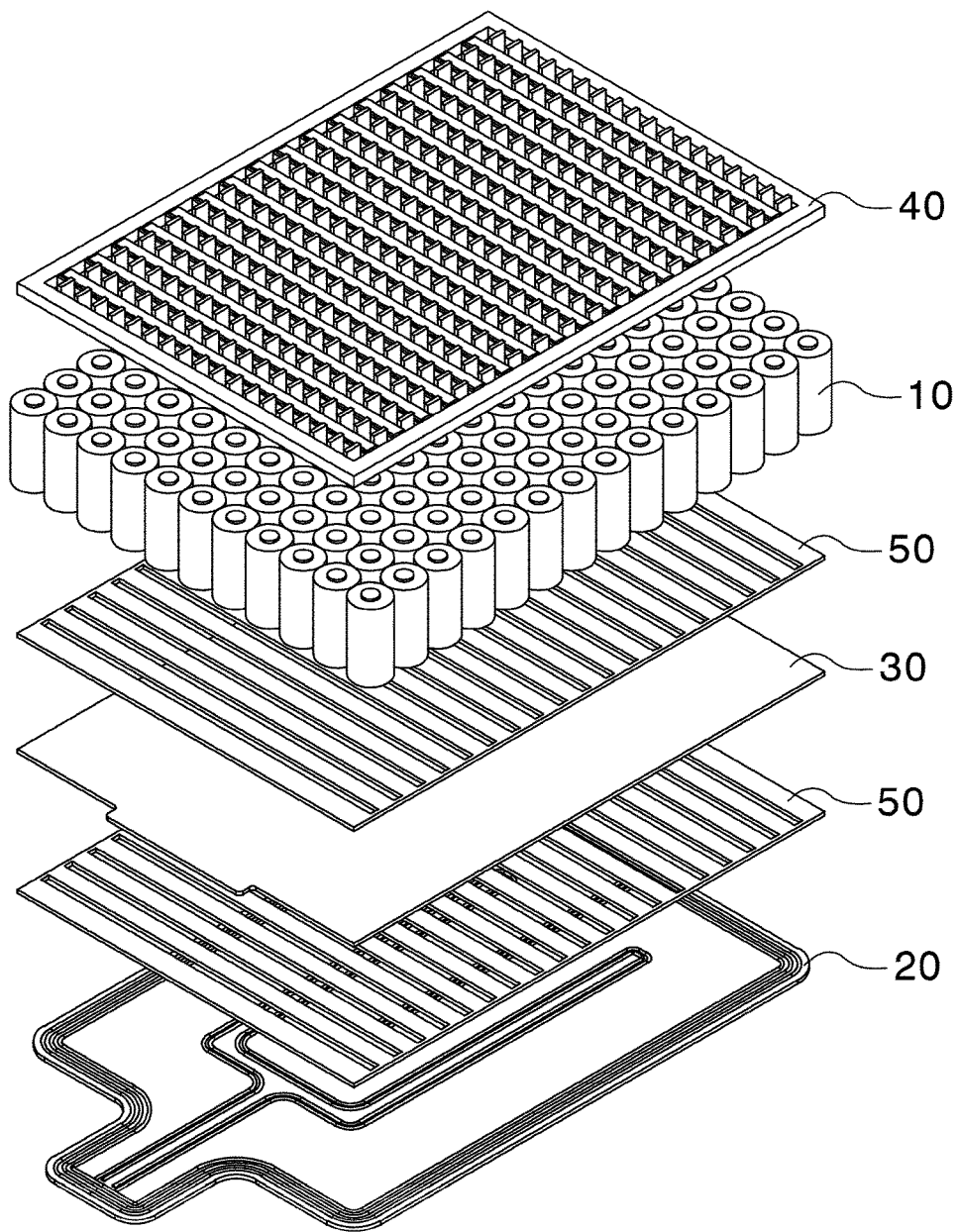

[FIG. 2]
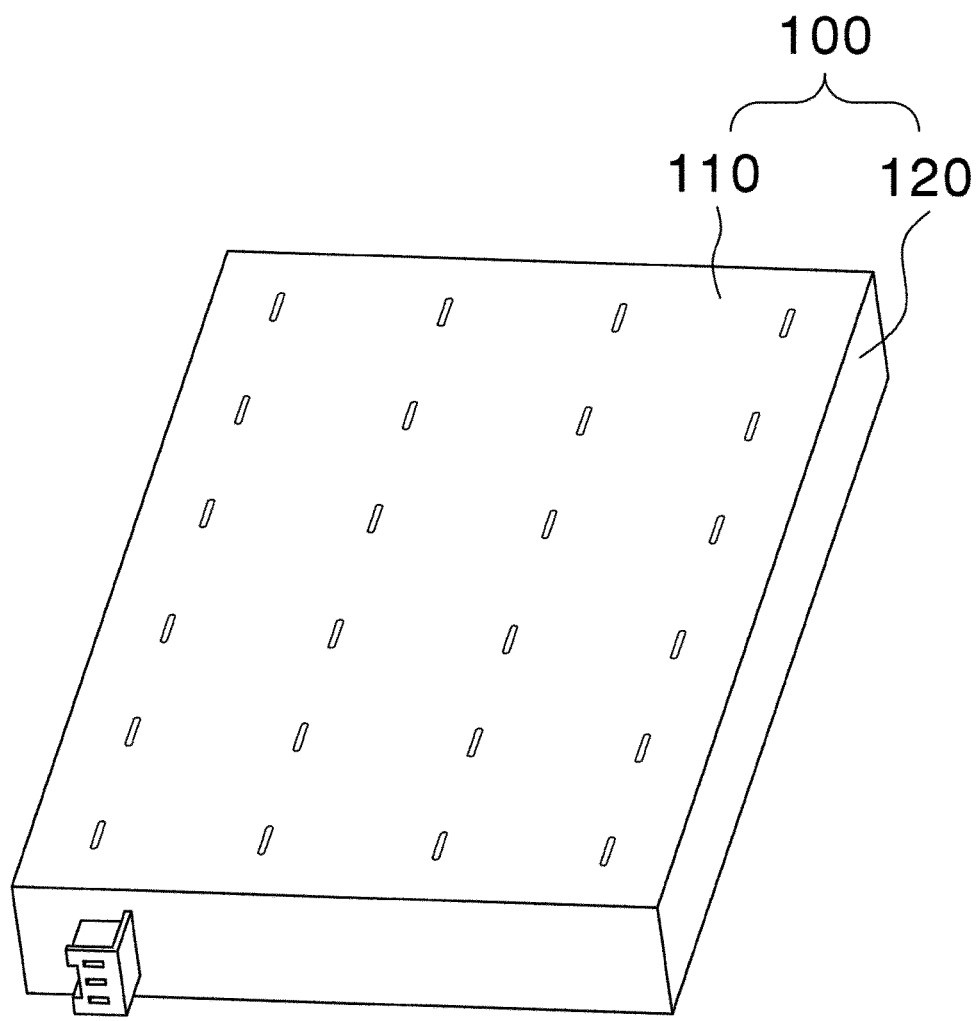

[FIG. 3]
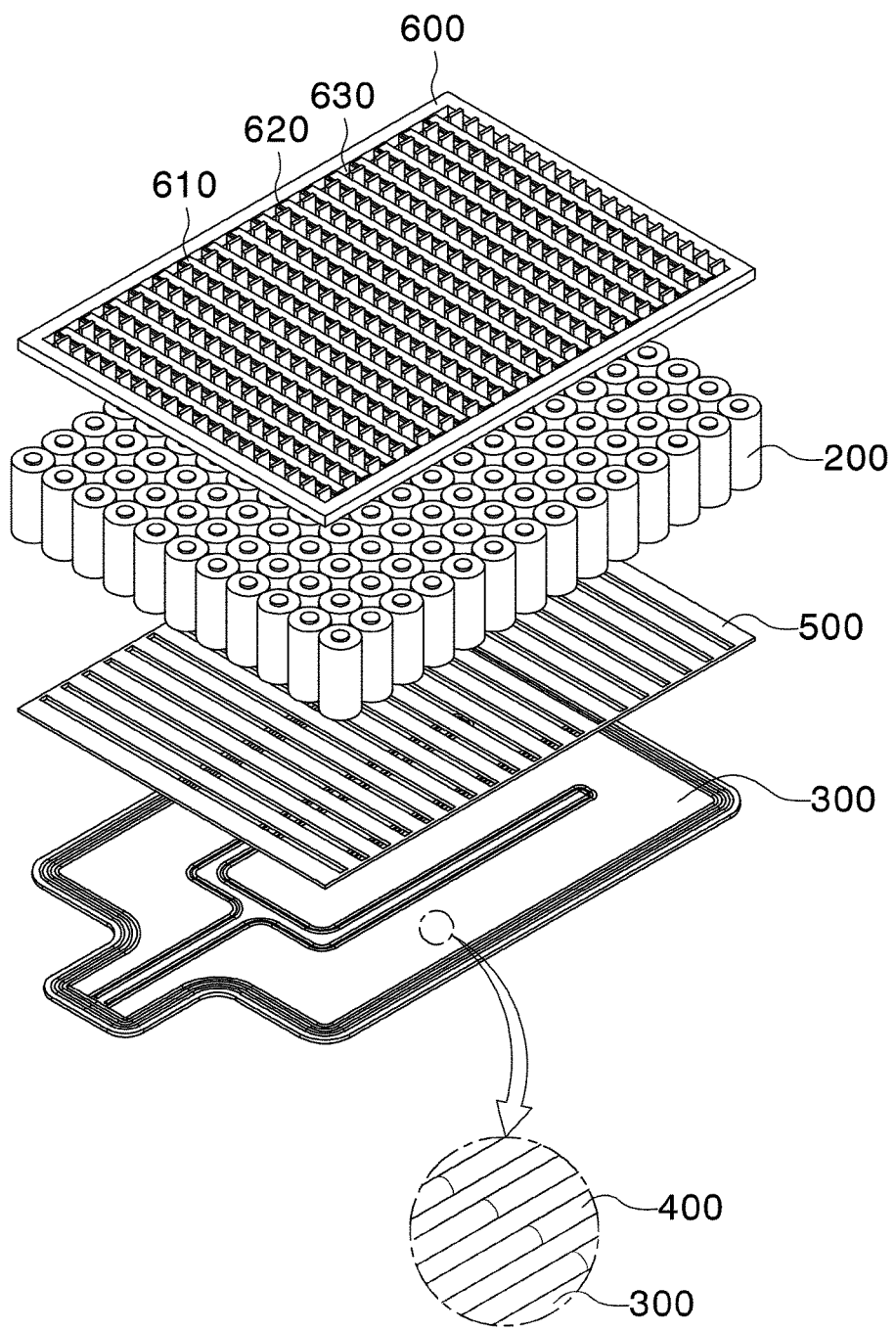

[FIG. 4]
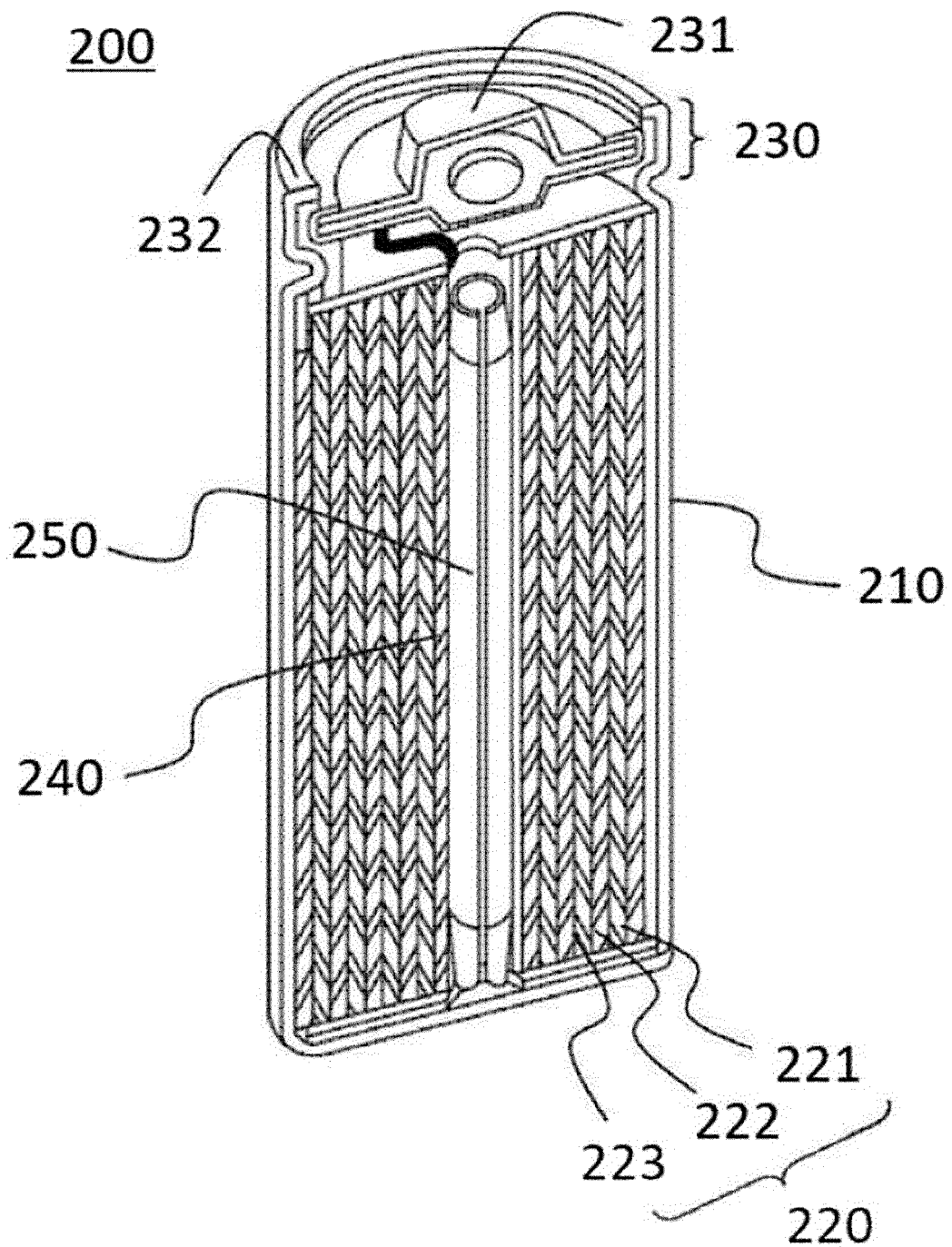

[FIG. 5]
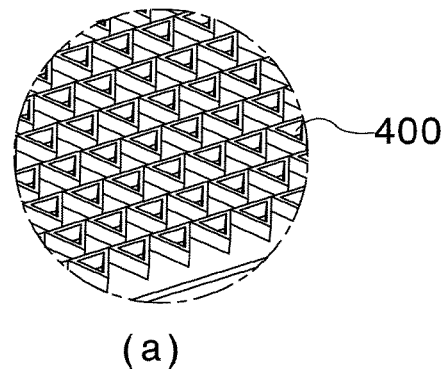
(a)
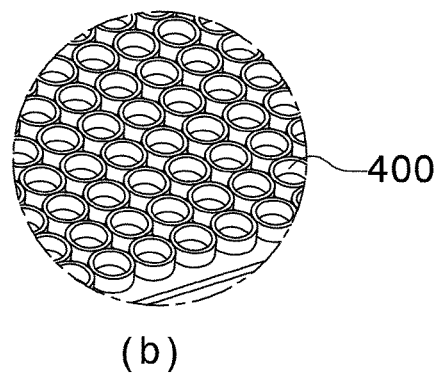
(b)
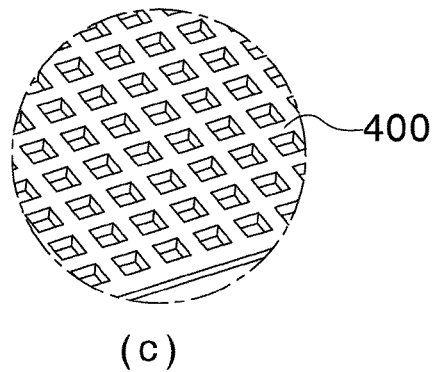
(c)

BATTERY MODULE WITH IMPROVED COOLING PERFORMANCE AND METHOD OF MANUFACTURING THE SAME

TECHNICAL FIELD

This application claims the benefit of priority to Korean Patent Application No. 2020-0105019 filed on Aug. 21, 2020, the disclosure of which is incorporated herein by reference in its entirety.

The present invention relates to a battery module with improved cooling performance and a method of manufacturing the same, and more particularly to a battery module configured such that an insulation layer located between a heat sink and a battery cell is fixed to one surface of the heat sink without a separate adhesive member, whereby cooling performance is improved and manufacturing cost is reduced, and a method of manufacturing the same.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, although a secondary battery has excellent electrical properties, components constituting the battery, such as an active material or an electrolyte, are decomposed in an abnormal operation state, such as overcharging, overdischarging, exposure to high temperature, or electrical short circuit, whereby heat and gas are generated. As a result, a swelling phenomenon, i.e. expansion of the secondary battery, occurs. The swelling phenomenon accelerates decomposition, which causes explosion or ignition of the secondary battery due to thermal runaway.

FIG. 1 is an exploded perspective view of a conventional battery module. As shown in FIG. 1, the conventional battery module includes a plurality of cylindrical battery cells 10, a heat sink 20 located under the plurality of cylindrical battery cells 10, an insulation layer 30 located between the cylindrical battery cells 10 and the heat sink 20 so as to maintain insulation therebetween, and a module frame 40 configured to cover the upper parts of the plurality of cylindrical battery cells 10. Adhesive layers 50 are interposed between the cylindrical battery cells 10 and the insulation layer 30 and between the heat sink 20 and the insulation layer 30 in order to achieve fixing therebetween.

In the conventional battery module, heat generated from the cylindrical battery cells 10 is removed by the heat sink 20 located under the cylindrical battery cells. Since the insulation layer 30 and the pair of adhesive layers 50 are provided between the cylindrical battery cells 10 and the heat sink 20, however, heat transfer efficiency is low.

Furthermore, in a battery module manufacturing process, the adhesive layers 50 must be formed twice in order to fix the heat sink 20 and the insulation layer 30 to each other and to fix the insulation layer 30 and the cylindrical battery cells 10 to each other, whereby manufacturing cost is increased while manufacturing process efficiency is reduced.

DISCLOSURE

Technical Problem

The present invention has been made in view of the above problems, and it is an object of the present invention to provide a battery module with improved cooling performance configured such that the distance between a cylindrical battery cell and a heat sink is minimized and a method of manufacturing the same.

It is another object of the present invention to provide a battery module with improved cooling performance configured such that the amount of raw material that is used is reduced, whereby manufacturing cost is reduced, and a manufacturing process is simplified, whereby productivity is improved, and a method of manufacturing the same.

Technical Solution

In order to accomplish the above objects, a battery module with improved cooling performance according to the present invention includes a plurality of cylindrical battery cells, a module frame configured In order to accomplish the above objects, a battery module with improved cooling performance according to the present may include a plurality of cylindrical battery cells, a module frame configured to electrically connect the plurality of cylindrical battery cells to each other, a heat sink located under the plurality of cylindrical battery cells, and an insulation layer formed on a surface of the heat sink in contact therewith.

Also, in the battery module according to the present invention, an adhesive layer may be located between the plurality of cylindrical battery cells and the insulation layer.

Also, in the battery module according to the present invention, the insulation layer may include a material having an insulation property and a thermal conductivity.

Also, in the battery module according to the present invention, the insulation layer may have a predetermined pattern.

Also, in the battery module according to the present invention, the predetermined pattern may be a lattice pattern.

Also, in the battery module according to the present invention, the predetermined pattern may be constituted by a plurality of polygons spaced apart from each other by a predetermined distance.

Also, in the battery module according to the present invention, the predetermined pattern may be constituted by a plurality of circles or a plurality of ovals.

Also, in the battery module according to the present invention, the predetermined pattern may be constituted by a plurality of bars spaced apart from each other by a predetermined distance.

Also, in the battery module according to the present invention, the adhesive layer may include at least one of hardenable grease and epoxy-based adhesive glue.

In addition, a battery pack including the battery module may be provided.

In addition, a battery module manufacturing method according to the present invention includes forming an insulation layer on a surface of a heat sink, forming an adhesive layer on a surface of the insulation layer, and seating a plurality of cylindrical battery cells on a surface of the adhesive layer.

Also, in the battery module manufacturing method according to the present invention, the insulation layer may be formed using a 3D printer.

Advantageous Effects

As is apparent from the above description, a battery module with improved cooling performance according to the present invention and a method of manufacturing the same have an advantage in that an insulation layer is fixed to a heat sink in tight contact therewith without a separate adhesive member, whereby heat generated from a cylindrical battery cell is rapidly transferred to the heat sink, and therefore it is possible to improve cooling performance.

In addition, the battery module with improved cooling performance according to the present invention and the method of manufacturing the same have a merit in that the insulation layer is fixed to the heat sink in tight contact therewith using a 3D printer, whereby it is possible to reduce the amount of the adhesive member that is used, and therefore it is possible to reduce manufacturing cost and to improve manufacturing process efficiency.

Furthermore, the battery module with improved cooling performance according to the present invention and the method of manufacturing the same have an advantage in that it is possible to freely adjust the thickness, area, and shape of the insulation layer through setting of the path of the 3D printer and adjustment of the output speed thereof.

DESCRIPTION OF DRAWINGS

FIG. 1 is an exploded perspective view of a conventional battery module.

FIG. 2 is an external perspective view of a battery module according to a preferred embodiment of the present invention.

FIG. 3 is an exploded perspective view of the interior of the battery module shown in FIG. 2.

FIG. 4 is a sectional view of a cylindrical battery cell mounted in the battery module according to the present invention.

FIG. 5 is a view showing various patterns of an insulation layer according to a preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module with improved cooling performance according to the present invention and a method of manufacturing the same will be described with reference to the accompanying drawings.

FIG. 2 is an external perspective view of a battery module according to a preferred embodiment of the present invention, and FIG. 3 is an exploded perspective view of the interior of the battery module shown in FIG. 2.

Referring to FIGS. 2 and 3, the battery module according to the present invention includes a module case 100, a cylindrical battery cell 200, a heat sink 300, an insulation layer 400, an adhesive layer 500, and a module frame 600.

First, the module case 100, which has an approximately hexahedral external shape, includes an upper case 110 and a lower case 120. The lower case 120 is constituted by a flat bottom and a side portion extending upwards perpendicularly from the edge of the bottom by a predetermined distance so as to provide a space portion having a predetermined size. The cylindrical battery cell 200, the heat sink 300, the insulation layer 400, the adhesive layer 500, and the module frame 600 are received in the space portion. The upper case 110 is coupled to an upper portion of the lower case 120 to protect the received cylindrical battery cell 200 and the like.

FIG. 4 is a sectional view of the cylindrical battery cell mounted in the battery module according to the present invention. The cylindrical battery cell 200 may be manufactured by receiving a wound type electrode assembly 220 in a metal can 210, injecting an electrolytic solution into the metal can 210, and then coupling a cap assembly 230 having an electrode terminal formed thereon to the open upper end of the metal can 210.

Here, the electrode assembly 220 is manufactured by sequentially stacking a positive electrode 221, a negative electrode 222, and a separator 223 and winding the same so as to have a round shape.

A cylindrical center pin 250 is inserted into a hollow core portion 240 formed at a central region of the electrode assembly 220. The center pin 250 is generally made of a metal material so as to have predetermined strength. The center pin 250 serves to fix and support the electrode assembly 220, and also serves as a passage configured to discharge gas generated as the result of internal reaction when the battery cell is charged and discharged and when the battery cell is operated.

Meanwhile, a positive electrode terminal 231 is formed on a central region of the upper end of the cap assembly 230 in a protruding state, and the remaining region of the metal can 210 forms a negative electrode terminal 232.

Of course, a battery cell usable as a secondary battery is not limited to a cylindrical battery cell 200 having the above construction.

Referring back to FIG. 3, heat is generated from the battery cell while the battery cell is repeatedly charged and discharged. In order to remove the heat, the heat sink 300 is located between the inner bottom surface of the lower case 120 and the cylindrical battery cell 200.

Although not shown in detail in the figure, the heat sink 300 is configured to have a structure in which a lower plate and an upper plate are spaced apart from each other by a predetermined distance so as to form a space portion therebetween, the space portion is filled with a refrigerant, such as water or ethanol, in the state in which the refrigerant is circulated. Consequently, heat generated from the cylindrical battery cell 200 is transferred to the refrigerant, whereby the cylindrical battery cell is maintained at a predetermined temperature.

Here, the heat sink 300 may be made of a material that exhibits high thermal conductivity so as to rapidly transfer heat, such as aluminum. Also, in order to circulate the refrigerant, the heat sink may be provided at one side thereof with a refrigerant inlet and may be provided at the other side thereof with a refrigerant outlet.

The insulation layer 400 is located on the upper surface of the heat sink 300 to prevent electrical conduction between the cylindrical battery cell 200 and the heat sink 300.

Specifically, the insulation layer 400 may be formed using a 3D printer. When an insulation material is discharged onto the upper surface of the heat sink 300 through a nozzle of the 3D printer, it is possible to form the insulation layer 400 on the upper surface of the heat sink 300 in a state of being fixed to the upper surface of the heat sink in tight contact therewith. Consequently, no separate adhesive member configured to fix the insulation layer 400 is necessary.

Furthermore, repetitive stacking is possible in the case in which a stacking type printing method is used. Consequently, it is possible to easily adjust the thickness of the insulation layer 400 and to implement various three-dimensional patterns. As an example, as shown in FIG. 3, the insulation layer 400 may be formed as the result of long bars, each of which has a circular or polygonal section, being fixed to the upper surface of the heat sink 300 in a state of being spaced apart from each other by a predetermined distance.

Meanwhile, although the material for the insulation layer 400 is not particularly restricted as long as the material exhibits not only an insulation property but also thermal conductivity, the material for the insulation layer may be polycarbonate, acrylonitrile butadiene styrene (ABS), or polycarbonate-acrylonitrile butadiene styrene (PC-ABS).

The adhesive layer 500 is located between the cylindrical battery cell 200 and the insulation layer 400 such that the cylindrical battery cell 200 is fixed to the insulation layer 400.

A liquid type adhesive may be applied to the upper surface of the insulation layer 400 to form a single adhesive layer 500.

Here, the adhesive layer 500, which is made of a material that thermal conductivity and heat resistance so as to transfer heat from the cylindrical battery cell 200 to the insulation layer 400 while not losing adhesive force at a high temperature, may be made of at least one of hardenable grease and epoxy-based adhesive glue. However, the material for the adhesive layer is not particularly restricted as long as the material is capable of perform the above functions.

The module frame 600, which is seated on the upper side of the cylindrical battery cell 200, includes a busbar 610, a protrusion 620, and an opening 630 configured to expose the upper surface of the cylindrical battery cell 200. The module frame performs a function of protecting cylindrical battery cells 200 from external impact while connecting the cylindrical battery cells to each other in parallel or in series.

FIG. 5 is a view showing various patterns of an insulation layer according to a preferred embodiment of the present invention. The insulation layer according to the present invention may have any of shapes shown in (a) to (c) of FIG. 5.

First, the insulation layer 400 of (a) of FIG. 5 is configured to have a structure in which hollow triangles each having a predetermined height are disposed side by side in a state of being spaced apart from each other. In the structure of the insulation layer 400, the triangles are hollow while insulation between the cylindrical battery cell 200 and the heat sink 300 is securely guaranteed, whereby it is possible to reduce the weight of the battery module and to reduce raw material cost. Meanwhile, although the insulation layer is shown as having a triangular structure in (a) of FIG. 5, which is merely an illustration, the insulation layer may have a polygonal structure, such as a quadrangular structure, a pentagonal structure, or a hexagonal structure.

(b) of FIG. 5 shows a hollow cylindrical shape instead of the triangular shape, and (c) of FIG. 5 shows a lattice structure.

Although the same shapes are shown as being repeatedly arranged in FIG. 5, a plurality of different shapes, such as triangles and circles or quadrangles and circles, may be mixed with each other to form the insulation layer 400.

Hereinafter, a method of manufacturing the battery module according to the preferred embodiment of the present invention described above will be described.

A battery module manufacturing method according to a preferred embodiment of the present invention includes (S1) a step of forming an insulation layer 400 on the upper surface of a heat sink 300, (S2) a step of forming an adhesive layer 500 on the upper surface of the insulation layer 400, and (S3) a step of seating a plurality of cylindrical battery cells 200 on the upper surface of the adhesive layer 500.

Specifically, in (S1) the step of forming the insulation layer 400 on the upper surface of the heat sink 300, the predetermined pattern is formed on the upper surface of the heat sink 300 to prepare the insulation layer 400. At this time, the predetermined pattern is formed using a 3D printer.

It is possible to freely adjust the thickness, area, and pattern of the insulation layer 400 by setting the output speed and path of the 3D printer.

In (S2) the step of forming the adhesive layer 500 on the upper surface of the insulation layer 400, the adhesive layer 500 is located on the upper surface of the insulation layer 400 in the state in which the upper surface of the heat sink 300 and the lower surface of the insulation layer 400 are attached to each other.

Here, the adhesive layer 500 may be formed by seating a film having adhesives applied to opposite surfaces thereof on the upper surface of the insulation layer or by applying a liquid type adhesive to the upper surface of the insulation layer.

The plurality of cylindrical battery cells 200 is fixed to the adhesive layer 500 through (S3) the step of seating the cylindrical battery cells 200 on the upper surface of the adhesive layer 500.

Of course, a module frame 600 is coupled to the upper parts of the cylindrical battery cells 200.

Meanwhile, although the heat sink 300 may be received in a lower case 120 first before steps S1 to S3, it is preferable for (S1) the step of forming the insulation layer 400 on the upper surface of the heat sink 300 to be performed before the heat sink is received in the lower case 120 such that the insulation layer 400 is easily formed using the 3D printer.

The present invention may provide a battery pack having the battery module received therein. In addition, the battery pack may be mounted in a device. For example, the device may be an electronic device including a large-capacity battery, such as an electric vehicle, a hybrid electric vehicle, or a plug-in hybrid electric vehicle.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Module case
110: Upper case
120: Lower case
200: Cylindrical battery cell
210: Metal can
220: Electrode assembly
221: Positive electrode 222: Negative electrode
223: Separator
230: Cap assembly
231: Positive electrode terminal 232: Negative electrode terminal
240: Core portion
250: Center pin
300: Heat sink
400: Insulation layer
500: Adhesive layer
600: Module frame
610: Busbar
620: Protrusion
630: Opening

The invention claimed is:

1. A battery module with improved cooling performance, the battery module comprising:
   a plurality of cylindrical battery cells;
   a module frame configured to electrically connect the plurality of cylindrical battery cells to each other;
   a heat sink located under the plurality of cylindrical battery cells; and
   an insulation layer formed on a surface of the heat sink and in contact with the heat sink,
   wherein the insulation layer has a predetermined pattern having through-holes in the predetermined pattern and the insulation layer.

2. The battery module according to claim 1, further comprising an adhesive layer located between the plurality of cylindrical battery cells and the insulation layer.

3. The battery module according to claim 1, wherein the insulation layer includes a material having an insulation property and a thermal conductivity.

4. The battery module according to claim 1, wherein the predetermined pattern is a lattice pattern.

5. The battery module according to claim 1, wherein the predetermined pattern is constituted by a plurality of polygons spaced apart from each other by a predetermined distance.

6. The battery module according to claim 1, wherein the predetermined pattern is constituted by a plurality of circles or a plurality of ovals.

7. The battery module according to claim 1, wherein the predetermined pattern is constituted by a plurality of bars spaced apart from each other by a predetermined distance.

8. The battery module according to claim 2, wherein the adhesive layer includes at least one of hardenable grease and epoxy-based adhesive glue.

9. A battery pack comprising the battery module according to claim 1.

10. A method of manufacturing a battery module with improved cooling performance, the method comprising:
    forming an insulation layer on a surface of a heat sink;
    forming an adhesive layer on a surface of the insulation layer; and
    seating a plurality of cylindrical battery cells on a surface of the adhesive layer,
    wherein the insulation layer is formed to have a predetermined pattern having through-holes in the predetermined pattern and the insulation layer.

11. The method according to claim 10, wherein the insulation layer is formed using a 3D printer.

12. The battery module according to claim 1, wherein the through-holes expose the surface of the heat sink through the through-holes.

* * * * *